(No Model.)  2 Sheets—Sheet 1.
G. W. STEVENS.
ICE MACHINE.
No. 258,682. Patented May 30, 1882.
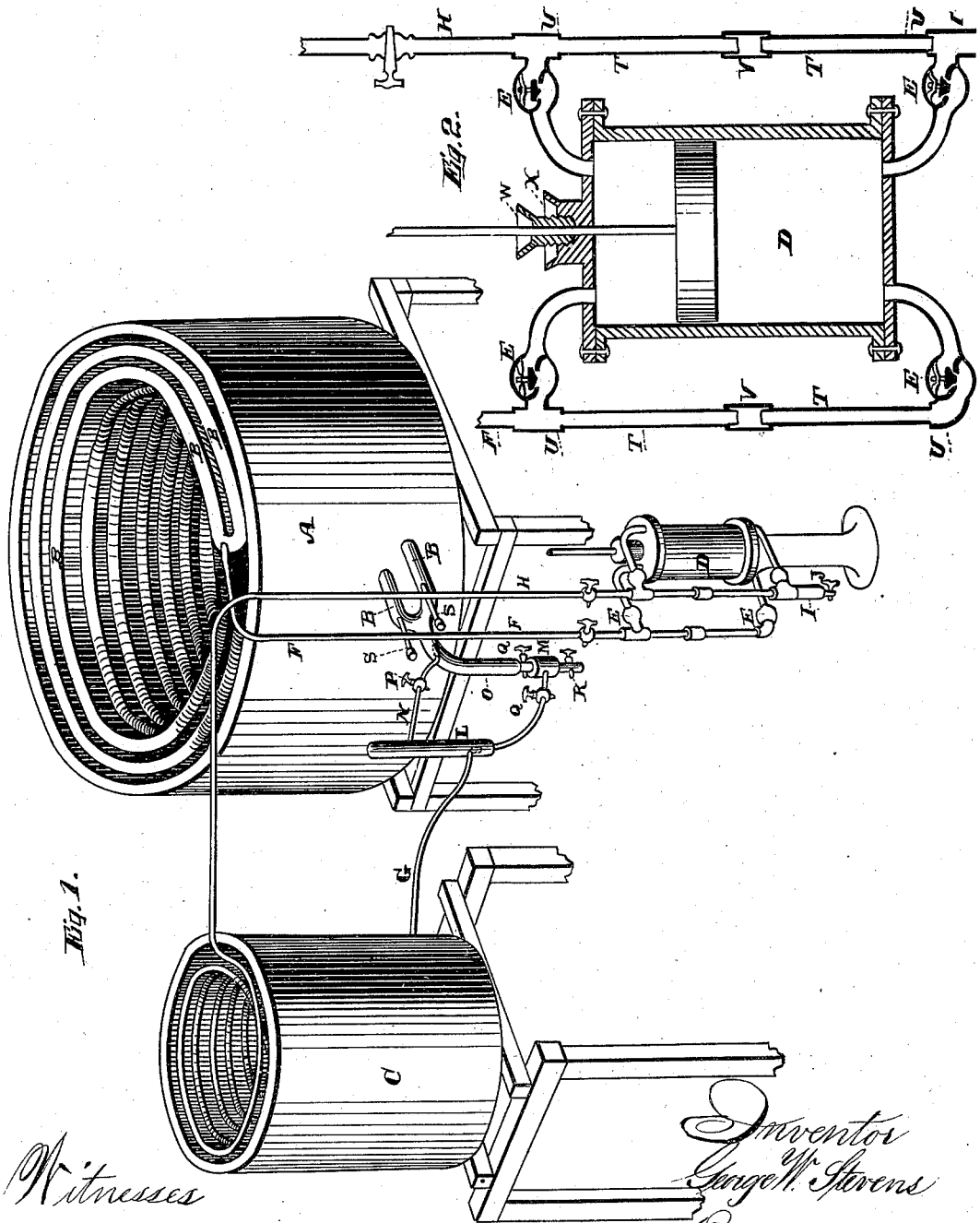
Witnesses
Geo. H. Strong.
Frank A. Brooks
Inventor
George W. Stevens
By Dewey & Co.
Attys (No Model.) 2 Sheets—Sheet 2.
G. W. STEVENS.
ICE MACHINE.
No. 258,682. Patented May 30, 1882.
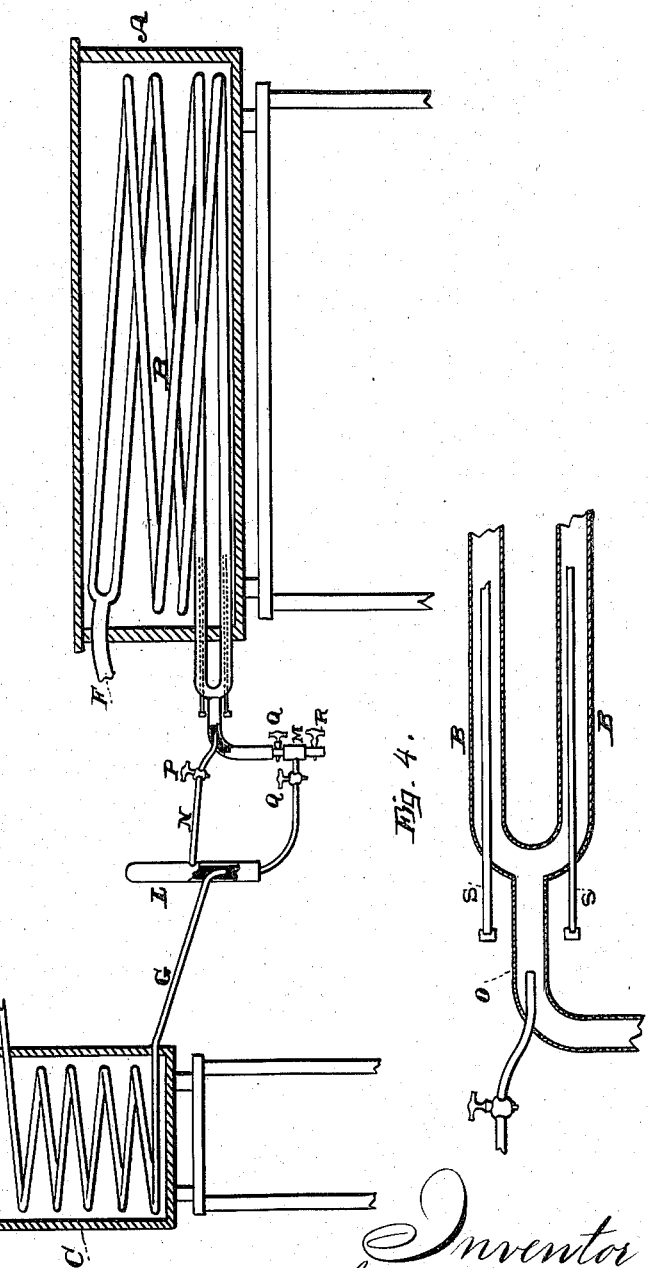
Witnesses
Geo. H. Strong.
Frank A. Brooks
Inventor
George W. Stevens
By Dewey & Co.
Attys

UNITED STATES PATENT OFFICE.

GEORGE W. STEVENS, OF SAN FRANCISCO, CALIFORNIA.

ICE-MACHINE.

SPECIFICATION forming part of Letters Patent No. 258,682, dated May 30, 1882.

Application filed December 30, 1881. (No model.)

*To all whom it may concern:*

Be it known that I, GEORGE W. STEVENS, of the city and county of San Francisco, State of California, have invented an Improvement in Ice-Machines; and I hereby declare the following to be a full, clear, and exact description thereof.

My invention relates to certain improvements in apparatus for refrigerating or ice-making of that class in which ethereal fluids are used; and it consists principally in certain details of construction, embracing traps, by which I am enabled to free the refrigerating-liquid from certain impurities which will collect in it in time, and also a means for agitating or breaking up and distributing the liquid as it flows from the condenser to the freezer, so that the expansion and consequent refrigeration will be more rapid and more equal.

It further relates to a means for increasing the surface over which the liquid is spread and for thawing out the pipes when frozen up.

The pump is vertical and may also be provided with a trap, and the gland of the stuffing-box through which the piston-rod passes has its upper surface made cup-shaped to contain glycerine, which surrounds the rod, while the exterior threaded portion of the gland is surrounded by a cup or pan filled with liquid, so that any leak at this point may be easily detected.

Referring to the accompanying drawings, Figure 1 is a general view of my apparatus. Fig. 2 is an enlarged vertical section of the pump. Fig. 3 is a vertical section taken through condenser, freezing-tank, and distributer. Fig. 4 is an enlarged view of the distributer and the liquefying-pipes.

A is the tank within which the freezing is carried on. I prefer to employ hollow cubical metallic vessels of any suitable shape and size, which are filled with fresh water, and are immersed in a strongly-saturated saline solution, with which the tank is filled. This solution is kept at a very low temperature by the expansion into a vapor of a volatile liquid flowing through pipes B, with which the tank is filled, and this vapor is again pumped from the tank-pipes into a condenser, C, by a pump, D. The particular construction of the freezing-tank and condenser is not especially important, any of the well-known forms being suitable.

The pump D is a double-acting one, having a solid plunger and valve-chambers E E.

The vapor is drawn through a pipe, F, from the freezing-tank, and is forced into the condenser, where it becomes liquid and flows out from it through a pipe, G.

The pipe H, through which the vapor leaves the pump, has a trap, I, at its lower end, with a discharge-cock, J, to be opened when it is desired to draw off any accumulation of water or other impurity from the trap.

The pipe G from the condenser opens into a vertical chamber, L, which has a pipe leading from its lower end to a trap, M. From the upper part of the chamber L a pipe, N, leads into the distributing-main O, and a cock, P, governs the supply, the liquid rising in the chamber L to the pipe and flowing through it, while the chamber above that point being closed, the vapor within it produces an elastic pressure similar to that of an air-chamber. The main O has its end curved downward, and a short pipe connects it with the trap M.

Cocks Q serve to open or close communication with the trap, which is thus so placed as to receive by gravitation any water or heavy impurity from both the freezing and the condensing tank. The cocks opening into the trap being closed, the discharge-cock may be opened and the contents, or any portion of them, discharged through a cock, R, at the bottom.

From the main O a number of smaller pipes, B, lead out and enter the tank A, within which they are carried around, so as to expose the largest quantity of the solution to their action.

Each of the pipes B forms an elbow or angle where they branch out, and smaller pipes S enter at these angles and extend a suitable distance into the pipes B, their inner ends being sealed tight. These pipes serve a double purpose—first, to spread the liquid into a thin sheet as it enters the pipe, and, second, as a means for the introduction of hot water to thaw out the pipes when they get frozen up.

The liquid is allowed to flow from pipe N into the main O, and, being blown in with considerable force, this breaks the column of liquid up. At the same time the liquid in passing around the pipes B is spread into a thin sheet and made to extend over a large surface. The pipes may also have sheets of fine gauze rolled so as to fill the space between the outer and inner pipes to more completely accomplish the result. The liquid thus treated expands very rapidly into vapor, thus producing an intense cold, which, transmitted through the saline solution to the fresh water within the cans, abstracts the heat therefrom and congeals said water. When ethereal liquids are employed for this purpose there forms in time in the liquid some water or other impurities which will freeze, and when the liquid is distributed and expanded in the pipes B, just after leaving the main O, the intense cold thus produced will freeze this water and choke the pipes. The machinery must then be stopped and the pipes thawed out at a great loss of time and expense. To prevent this I employ the interior closed pipes, S, having a coupling at their outer ends by which hot-water or steam pipes may be connected. It is better to use a hot saline solution, as this would not freeze within the pipes, and by this arrangement the pipes may be cleared in a short time and with but little delay.

As many of the smaller pipes B may be employed as are found necessary, all opening out from the main O, and after they have passed through the freezing-tank they are again united into a single pipe, F, which leads to the pump and condenser.

By the use of the double pipes and distributing devices at the entrance to the freezing-tank the amount of refrigerating-liquid necessary will be very much lessened, and the surface over which it is spread will be increased.

The pump has two sets of valves, E, at top and bottom, one set being connected with the supply or suction pipe F and the other set with the discharge-pipe H. The upper and lower valve-chambers of each set are connected with the supply and discharge pipes by intermediate pipes, T, which screw into couplings U, connected with each valve-chamber. This necessitates forming the pipes T in two parts, so they may be screwed firmly into their respective couplings; but this operation separates their adjacent ends. In order to connect these, I form a sleeve, V, of lead and of sufficient length to inclose the two ends. This sleeve is soldered to the lower pipes before it is screwed in, and the upper pipe is also placed with its end in the sleeve. After the lower one is screwed fast, the upper one is screwed up into place, which draws it away from the lower one, but still leaves its end within the sleeve. When the upper joint is made solid the sleeve is soldered to the upper pipe, and the joint is thus closed tight.

In order to give notice of any leakage of the subtle ethereal vapor which is used in my machine, the gland W of the stuffing-box is made cup-shaped and is filled with glycerine. Below the gland is a second cup, X, into which the screw-threads on the exterior of the gland fit, and this is also filled with glycerine or other liquid, so that any leakage around the rod or the threads of the gland will be at once detected.

Having thus described my invention, what I claim as new, and desire to secure by Letters Patent, is—

1. In an ice-machine, and in combination with the freezing and condensing tanks, the vertical chamber L, with closed extension at the top, and having the supply-pipe G, leading into the lower part from the condenser, and the pipe N, leading from the upper part into the distributing-main O, in combination with the trap M and cocks, as shown, connected with both chamber and main, so that any heavy liquid will gravitate into it, substantially as herein described.

2. In an ice-machine, the main O, having the small supply-pipe N, opening into it from the pressure-chamber L and in the direction of its length, so that the liquid may be blowed through into the main under pressure, substantially as and for the purpose herein described.

3. In an ice-machine, and in combination with the chamber L, pipe N, with its cock P, and the main O, the small branch pipes B, leading from the main through the freezing-tank A, and having the wire-gauze or equivalent distributing material compressed into them, substantially as herein described.

4. In an ice-machine, and in combination with the chamber L, pipe N, with its cock P, the distributing-main O, and the branch pipes B, the pipes S, secured centrally within the pipes B, to spread the liquid into thin sheets within the outer pipes, substantially as herein described.

5. In an ice-machine, and in combination with the chamber L, pipe N, cock P, distributing-main O, and branch pipes B, the hollow pipes S, extending into the pipes B, and having their interior ends closed and their outer ends fitted with couplings, whereby steam or hot water may be introduced, substantially as and for the purpose herein described.

6. The pump D, having the valve-chambers E above and below, as shown, and the connecting-pipes F H, formed with screw-threads at opposite ends to connect with the couplings U, in combination with the leaden connecting-sleeve V, inclosing the meeting ends of the pipes, and soldered to them, after they are secured in place, to form a joint, substantially as herein described.

In witness whereof I hereunto set my hand.

GEORGE W. STEVENS.

Witnesses:
S. H. NOURSE,
FRANK A. BROOKS.